Reissued Mar. 4, 1941 Re. 21,736

UNITED STATES PATENT OFFICE 21,736

RESIN BONDED ABRASIVE ARTICLE

Samuel S. Kistler, West Boylston, and Carl E. Barnes, Worcester, Mass., assignors to Norton Company, Worcester, Mass., a corporation of Massachusetts No Drawing. Original No. 2,189,733, dated February 6, 1940, Serial No. 187,550, January 28, 1938. Application for reissue September 3, 1940, Serial No. 355,210

5 Claims. (Cl. 51—298)

The invention relates to grinding wheels and other abrasive articles bonded with synthetic resins, and with regard to its more specific features to abrasive articles bonded with modified polymers of esters of acrylic acid and substituted acrylic acids in which the substituent is either methyl or chlorine.

One object of the invention is to provide an abrasive article bonded with a hard resin of the class indicated. Another object of the invention is to provide an abrasive article bonded with a heat resistant resin of the class indicated, preferably softening above 100° C. Another object of the invention is to provide a grinding wheel bonded with a synthetic resin, having some of the characteristics of shellac bonded grinding wheels. Another object of the invention is to provide a grinding wheel bonded with a synthetic resin having some of the characteristics of rubber. Another object of the invention is to provide a grinding wheel bonded with a synthetic resin having characteristics superior to either those of shellac or rubber for certain purposes and capable of substantial duplication in its physical properties. Another object of the invention is to provide a grinding wheel bonded with a synthetic resin having definite characteristics advantageous for the manufacture of grinding wheels.

Another object of the invention is to provide a grinding wheel bonded with a synthetic resin having one or more of the following characteristics: soft as compared with phenol-formaldehyde, readily controllable, resistant to heat as compared with shellac and rubber, and capable of being incorporated in a wide range of products. Another object of the invention is to provide a grinding wheel bonded with a resin capable of being made in different degrees of hardness.

Another object of the invention is to provide grinding wheels bonded with resins from esters of acrylic or methacrylic acids having higher softening points and greater strength at elevated temperatures than such resins as have heretofore been made from these substances. Another object of the invention is to provide grinding wheels bonded with resins from esters of acrylic acid or methacrylic acid. Other objects will be in part obvious or in part pointed out hereinafter.

The invention accordingly consists in the combinations of elements, arrangements of parts, and in the several steps and relation and order of each of said steps to one or more of the others thereof, all as will be illustratively described herein, and the scope of the application of which will be indicated in the following claims.

It is known that the esters of acrylic acid and substituted acrylic acids in which the substituent is either methyl or chlorine polymerize to form transparent solids having many useful properties. For the manufacture of abrasive articles, however, the low softening points of these materials may be a disadvantage.

We provide a suitable ester of acrylic acid or an alpha substituted acrylic acid in which the substituent is either methyl or chlorine. We copolymerize this ester with one or more of the various substances hereinafter disclosed. These substances comprise those containing more than one unsaturated group per molecule, each unsaturated group being capable of independent polymerization. These we refer to as "cross-linking agents."

Preferred cross-linking agents are the esters of acrylic or alpha substituted acrylic acids in which the substituent is either methyl or chlorine with polyhydric alcohols. We have found the esters of methacrylic acid and the following alcohols to be effective: ethylene glycol, diethylene glycol, triethylene glycol, glycerol, pentaglycerol, trimethylene glycol, pentaerythritol, and mannitol.

For the manufacture of the cross-linking agent, we may proceed as follows:

In preparing these esters of acrylic acid or its derivatives, customary methods of esterification may be employed such as direct esterification of the acid and alcohol with or without a catalyst, alcoholysis, the reaction of the acid chloride with an alcohol, or its metallic derivative, and the reaction of the acid anhydride and an alcohol with or without the addition of an organic base, such as pyridine. It is usually preferable to include an inhibitor, such as pyrogallol, to prevent polymerization, but this must be removed before the ester can be polymerized or used for cross-linking.

*Example I*

Ethylene glycol dimethacrylate was prepared as follows: Twelve and four-tenths grams (0.2 mol) of ethylene glycol and eighty grams (0.80 mol) methyl methacrylate were mixed, and ten drops of concentrated sulphuric acid were added. To this solution was added one-tenth gram pyrogallol. The mixture was placed in a flask with a condenser attached and heated to 90° C. for twenty-four hours. During this period methyl alcohol distills out and gives a rough indication of the progress of the reaction. When all of the methyl alcohol has distilled over, the temperature is raised and the excess methyl methacrylate is distilled off. Before the methyl methacrylate is distilled off, it is advisable to shake the product with aqueous sodium carbonate solution to eliminate the sulphuric acid that was added as catalyst. Since some of the pyrogallol is removed by this treatment, it is desirable to add some excess before distilling to avoid polymerization. The residue from this distillation is taken up in ether and shaken with dilute sodium hydroxide. After the elimination of the pyrogallol by the treatment with aqueous sodium hydroxide, the ether solution is dried with calcium chloride and the ether is removed by suction.

The impure viscous ester thus obtained is suitable for use with methyl methacrylate as a cross-linking agent. The pure ester may be prepared by vacuum distillation of this product.

This method outlined above is generally applicable to the preparation of the methacrylates of the polyhydric alcohols that are not insoluble in methyl methacrylate.

In the preparation of these cross-linking agents, it has not been necessary for us completely to purify them, but three have been obtained in a high state of purity and their boiling points for a specified vapor pressure are given below.

| Compound | Temperature | Pressure |
|---|---|---|
| | *Degrees* | *Millimeters* |
| Ethylene glycol dimethacrylate | 83 to 85 | 5 |
| Pentaglycerol trimethacrylate | 170 | 1 |
| Trimethylene glycol dimethacrylate | 130 | 6 |

We may make a molding powder by the copolymerization of a monohydric alcohol ester of acrylic or alpha substituted acrylic acid, of the class heretofore indicated, with one or more of the above cross-linking agents. The preferred derivative is methyl methacrylate. Such molding powders may be used for the production of grinding wheels bonded with these resins. We may also form the resins in situ around the abrasive grains. We may use any of the commonly used or known abrasives, for example alumina, including fused alumina, emery and corundum, silicon carbide and other carbides, e. g., boron, tungsten and tantalum carbides, diamond bort, quartz, garnet, etc. Accordingly, we shall first give specific examples for the manufacture of grinding wheels.

*Example II*

Taking three hundred and ninety cubic centimeters of methyl methacrylate and one hundred cubic centimeters of ethylene glycol dimethacrylate and ten cubic centimeters of methyl methacrylate containing one per cent of benzoyl peroxide as a catalyst, we mix them. This mixture is poured on top of one thousand six hundred and fifty-six grams of abrasive grain in a circular mold substantially the size of the ultimate grinding wheel. The abrasive grain can be of any desired type, for example aluminum oxide or silicon carbide, and of any grit size desired. The liquid quickly penetrates into the mass of abrasive grains, and wets them all, but having a specific gravity less than the grains there will be clear liquid above them. The mold will be a cylindrical container with a plug for the internal hole of the wheel and with a slight taper to its otherwise cylindrical walls. It may be a dish, that is, having a cylindrical side, an integral bottom, and preferably has a removable disk cover plate. Aluminum and stainless steel have been found to be satisfactory metals from which to make the molds.

We then place the mold in an oven and heat to 60° C. for a period of about twenty-four hours. We then give the wheel a final bake at 110° C. for a period of five hours. We then remove the wheel from the mold, bush and true it. The times and temperatures given are illustrative and may be varied widely with good results, those given being recommended.

This is a wheel of nearly zero porosity and gives excellent results in certain grinding operations. The proportion of ethylene glycol dimethacrylate may be varied widely, for example between five and thirty per cent. The more ethylene glycol dimethacrylate is used, the harder is the wheel.

*Example III*

Proceeding as in Example I, we substitute glycerol trimethacrylate for ethylene glycol dimethacrylate.

*Example IV*

Proceeding as in Example II, we substitute pentaglycerol trimethacrylate for ethylene glycol dimethacrylate.

*Example V*

For the manufacture of grinding wheels, we may prefer under some circumstances to produce first a powdered polymer, then proceed to add the powder to the abrasive grains and mix thoroughly. The abrasive may be wet with a suitable liquid before adding the powder, if desired. A grinding wheel according to this example and procedure may be made of suitable abrasive grains, the powder having been first produced as follows: To thirty cubic centimeters ethylene glycol dimethacrylate and five hundred and seventy cubic centimeters methyl methacrylate is added six-tenths gram of benzoyl peroxide. The mixture is then added to fourteen hundred cubic centimeters of carbon tetrachloride, in which it is completely miscible, and placed in a constant temperature bath maintained at 65° C. After an induction period of about five hours, the copolymer, being insoluble in the carbon tetrachloride, begins to precipitate as a fine powder and is filtered off, washed with carbon tetrachloride and dried.

We mix sixteen hundred and fifty-six grams of abrasive grain with five hundred grams of the above described powder and place in a mold. We press the mixture for thirty minutes in an hydraulic press with platens heated to 160° C., then strip from the mold. The wheel is then complete, the heat and pressure having softened and coalesced the resin so that it forms with the abrasive grain an integral piece.

We may also make grinding wheels using for a bond any of the other resins herein indicated or described, proceeding according to Example II or otherwise. These grinding wheels have some of the general characteristics of rubber and shellac bonded grinding wheels and have characteristics superior to these for certain purposes. One advantage of our novel wheels is that we can accurately control the production and duplicate results very closely.

In the examples given, we have used only the esters of methacrylic acid. It is to be understood, however, that the esters of alpha chloro acrylic acid may be used within the scope of this invention. Also, whereas the methyl ester of methacrylic acid is most commonly referred to, other monohydric alcohol esters, such as isopropyl, isobutyl or phenyl esters could equally well have been used.

While we have described the production of grinding wheels made from abrasive grains and resin alone, it is to be understood that we may also incorporate a wide variety of fillers. In case the resin is polymerized in situ, the filler must not contain inhibitors that will prevent the polymerization.

The present patent is directed to our novel abrasive articles. The novel method of making grinding wheels herein disclosed is claimed in a separate copending application Serial No. 187,549 filed on January 28, 1938.

It will thus be seen that there has been provided by this invention a composition of matter and an article of manufacture in which the various objects hereinabove set forth together with many thoroughly practical advantages are successfully achieved. As many possible variations may be made in the embodiments above set forth, it is to be understood that all matter hereinbefore set forth is to be interpreted as illustrative and not in a limiting sense.

We claim:

1. As an article of manufacture, an abrasive body comprising abrasive grains bonded with copolymerized compounds comprising methyl methacrylate and ethylene glycol dimethacrylate.

2. As an article of manufacture, an abrasive body comprising abrasive grains bonded with copolymerized compounds comprising methyl methacrylate and glycerol trimethacrylate.

3. As an article of manufacture, an abrasive body comprising abrasive grains bonded with copolymerized compounds comprising methyl methacrylate and pentaglycerol trimethacrylate.

4. As an article of manufacture, an abrasive body comprising abrasive grains bonded with copolymerized compounds comprising methyl methacrylate and a polyhydric alcohol ester of methacrylic acid.

5. As an article of manufacture, an abrasive body comprising abrasive grains bonded with copolymerized compounds comprising a monohydric alcohol ester of an acid selected from the group consisting of acrylic acid and its alpha substitution products in which the substituent is selected from the group consisting of methyl chlorine, and a polyhydric alcohol ester of an acid selected from the same group.

SAMUEL S. KISTLER.
CARL E. BARNES.

CERTIFICATE OF CORRECTION.

Reissue No. 21,736. March 4, 1941.

SAMUEL S. KISTLER, ET AL.

It is hereby certified that error appears in the printed specification of the above numbered patent requiring correction as follows: Page 3, second column, line 23, claim 5, after the word "methyl" insert --and--; and that the said Letters Patent should be read with this correction therein that the same may conform to the record of the case in the Patent Office.

Signed and sealed this 1st day of July, A. D. 1941.

(Seal)

Henry Van Arsdale,
Acting Commissioner of Patents.